United States Patent [19]

Voss

[11] Patent Number: 4,954,206

[45] Date of Patent: Sep. 4, 1990

[54] WELDING APPARATUS FOR WELDING PLASTIC WEB INCLUDING TENSIONED STRIPS OF POLYTETRAFLUOROETHYLENE

[75] Inventor: Hans-Ludwig Voss, Tecklenburg, Fed. Rep. of Germany

[73] Assignee: Windmöller & Hölscher, Lengerich, Fed. Rep. of Germany

[21] Appl. No.: 249,687

[22] Filed: Sep. 27, 1988

[30] Foreign Application Priority Data

Sep. 28, 1987 [DE] Fed. Rep. of Germany ....... 3732639

[51] Int. Cl.$^5$ ..................... B30B 15/04; B30B 15/34
[52] U.S. Cl. ..................... 156/537; 156/583.1
[58] Field of Search ............ 156/289, 323, 537, 583.1, 156/583.2, 583.5; 100/93 P

[56] References Cited

U.S. PATENT DOCUMENTS

| | | | |
|---|---|---|---|
| 2,958,368 | 11/1960 | Dreeben | 100/93 P |
| 3,473,995 | 10/1969 | Schott | 156/583.5 |
| 3,703,427 | 11/1972 | Sellers et al. | 156/583.2 |
| 4,105,489 | 8/1978 | Lotto | 156/583.1 |
| 4,229,244 | 10/1980 | Swope | 100/93 P |
| 4,674,266 | 6/1987 | Araki | 156/583.5 |

FOREIGN PATENT DOCUMENTS

| | | | |
|---|---|---|---|
| 2004574 | 10/1971 | Fed. Rep. of Germany | 156/583.1 |
| 2244820 | 3/1974 | Fed. Rep. of Germany | 156/583.1 |
| 2358281 | 6/1975 | Fed. Rep. of Germany | 156/583.1 |
| 2743494 | 10/1978 | Fed. Rep. of Germany | 156/583.1 |
| 2845271 | 4/1980 | Fed. Rep. of Germany | 156/583.1 |

*Primary Examiner*—Michael W. Ball
*Assistant Examiner*—Steven D. Maki
*Attorney, Agent, or Firm*—Fleit, Jacobson, Cohn, Price, Holman & Stern

[57] ABSTRACT

A welding apparatus for welding flat webs or web sections made of synthetic thermoplastics comprises two parallel welding bars, which are adapted to be raised and lowered relative to each other, and tensioned strips of polytetrafluoroethylene, preferably strips of polytetrafluoroethylene which are reinforced by glass fiber woven fabrics, which strips cover said welding bars and are fixed on rolls, which are disposed beyond opposite ends of each welding bar and serve to wind up and unwind said tensioned strips. The rolls are movably mounted beyond opposite ends of the welding bars on axles extending transversely to said welding bars.

5 Claims, 7 Drawing Sheets

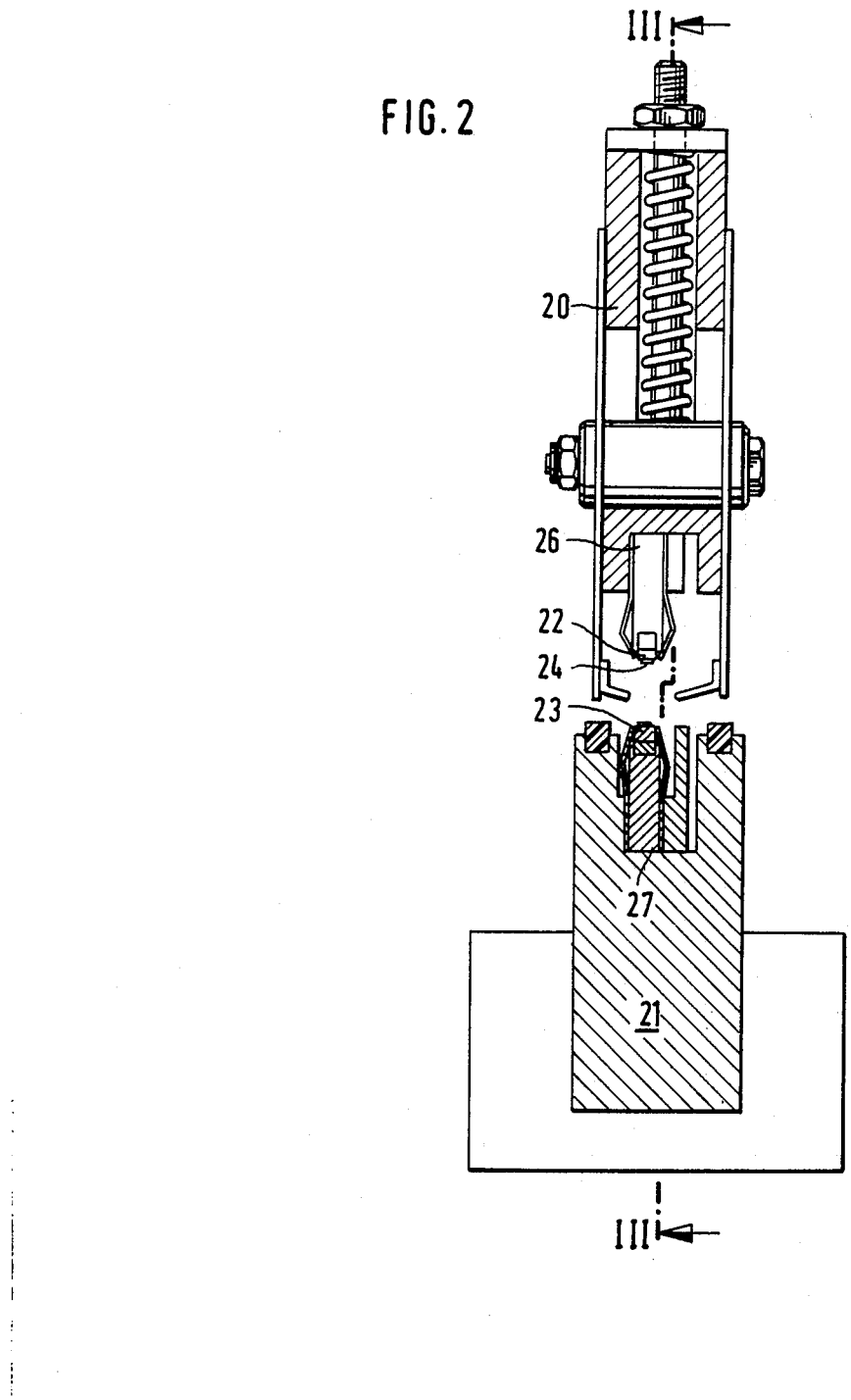

WELDING APPARATUS FOR WELDING PLASTIC WEB INCLUDING TENSIONED STRIPS OF POLYTETRAFLUOROETHYLENE

BACKGROUND OF THE INVENTION

1. Field of the Invention

This invention relates to a welding apparatus for welding flat webs or web sections made of synthetic thermoplastics, comprising two parallel welding bars, which are adapted to be raised and lowered relative to each other, and tensioned strips, preferably strips of which are reinforced by glass fiber woven fabrics, which strips cover said welding bars and are fixed to rolls, which are disposed beyond opposite ends of each welding bar and serve to wind up and unwind said tensioned strips.

2. Description of the Prior Art

Such welding apparatuses are known, e.g., from German Patent Specification 20 04 574, German Patent Publication 27 43 494 and Published German Applications 23 58 281 and 28 45 271. The tensioned strips which are made of polytetrafluoroethylene and cover the welding bars are used to prevent the welding bars from sticking to the plastic films. A welding apparatus of the kind described first hereinbefore and is known from practice will now be described with reference to FIG. 1 of the drawing. That known welding apparatus consists of the upper and lower welding jaws 2. A severing knife 3 is provided laterally of the upper welding jaw 2 and by drive means, not shown, is adapted to be lifted and lowered in unison with the upper welding jaw. The welding bars of the upper and lower welding jaws are covered by strips of polytetrafluoroethylene. The means for winding up and for unwinding the strips of polytetrafluoroethylene and for tensioning said strips over the welding bar are basically identical for the upper and lower welding jaws. For this reason such means will be described only with reference to the lower welding bar. The tensioned polytetrafluoroethylene strip which covers the welding bar has a width which is approximately as large as the length of the welding bar and is fixed to the rolls 5, 6. The polytetrafluoroethylene strip is unwound from the roll 5 and is wound up on the roll 6. The polytetrafluoroethylene strip is advanced in that it is wound up on the roll 6 and unwound from the roll 5. That operation is performed in dependence on the welding time and welding temperature. This means that the polytetrafluoroethylene strip is pulled forward by a predetermined length after a predetermined number of cycles so that an unused length of the polytetrafluoroethylene strip will be available between the welding bars for the succeeding operating time. The roll 6 for winding up the polytetrafluoroethylene strip is accommodated in a space 7, which is defined by the crossbeam 8, which carries the welding jaw, and by another crossbeam 9, which carries a retaining member for the web sections which have been severed, such as bags or sacks made of film. The retaining member consists of a spring-cushioned pad 10, which cooperates with a corresponding backing pad. The roll from which the polytetrafluoroethylene strip is unwound is mounted in a groove 12 that is disposed below the crossbeam 8 which carries the welding jaw. That roll is so designed that it will not laterally protrude beyond the outline of the welding jaw unit. Additional retaining members and structural elements are disposed on both sides of the welding jaw unit. Said additional elements act to sever and weld the film web during the standstill times and must be disposed as closely as possible to the welding and cutting region so that the film web will be held as taut as possible. As the rolls 5, 6 which serve to wind up and unwind the polytetrafluoroethylene strip must be disposed within the outline of the welding unit if a compact design is to be obtained, the known welding apparatus is highly expensive. Besides, the servicing of the known apparatus is complicated and time-consuming because the crossbeams 8, 9 must be removed before the rolls 5, 6 can be replaced when the polytetrafluoroethylene strip has been used up.

Another disadvantage of the known apparatus resides in that the rolls 5, 6 have been wound on long rods, which are usually relatively thin so that they may be deflected in such a manner that the tensioned polytetrafluoroethylene strip which covers the welding bars may become distorted and may form waves and creases.

SUMMARY OF THE INVENTION

For this reason it is an object of the invention to provide an apparatus which is of the kind described first hereinbefore and is compact and ensures an effective tensioning and effective guidance of the polytetrafluoroethylene strip and which can easily be serviced and permits a simple replacement of used up polytetrafluoroethylene strips by new ones.

In an apparatus which is of the kind described first hereinbefore that object is accomplished in that the tensioned polytetrafluoroethylene strips covering the welding bars extend in the longitudinal direction of said bars and the rolls are movably mounted beyond opposite ends of the welding bars on axles extending transversely to said welding bars. In the welding apparatus in accordance with the invention the rolls for holding and storing the polytetrafluoroethylene strips are disposed in a region in which adequate space is available so that said strips do not occupy a space which is urgently required for other purposes. Because the rolls for winding and unwinding the polytetrafluoroethylene strips are disposed beyond opposite ends of the welding jaws, said rolls are readily accessible and can readily be serviced and replaced. In the apparatus in accordance with the invention the polytetrafluoroethylene strips are pulled over the welding bars in the longitudinal direction of the latter so that said strips may be relatively narrow and the rolls may be narrow too and, as a result, can easily be arranged and mounted.

In a desirable arrangement, backing or guiding elements are provided at least on one side of each welding bar and each of said elements together with one side of the associated welding bar defines a passage for guiding an edge portion of the polytetrafluoroethylene strip. The guiding elements may consist of spring plates, which are screw-connected to the welding bars. The guide passage may alternatively be provided between the welding bar and a severing knife, which is screw-connected to the welding jaw. The guiding elements or spring plates may extend throughout the length of the welding bars or may consist of spaced apart sections.

In a desirable arrangement, deflecting rods or deflecting rollers for guiding the polytetrafluoroethylene strips are provided between the ends of the welding bars and the rolls. Such deflecting rods or rolls will ensure that the strip which has been withdrawn from a roll will satisfactorily run up on the welding bar and the used up strip which has been withdrawn from the welding bar will satisfactorily run up on the winding roll.

The rolls or their hubs or cores are suitably engaged by spring-loaded braking elements for retaining the rolls in positions in which the polytetrafluoroethylene strips are tensioned.

In accordance with a further feature of the invention, that roll which withdraws the polytetrafluoroethylene strip is mounted on the associated axle by means of a free-wheel and is provided with a lever, which is intermittently moved in small angular increments and is adapted to be reset. That lever is operated with a timing which depends to the consumption of the polytetrafluoroethylene strip. As a result, the used-up polytetrafluoroethylene strip will be withdrawn in small steps and the welding bars will always be covered by tensioned polytetrafluoroethylene strips which are in an operative condition. The intermittent pivotal movement of the levers may be derived from the motion of the welding jaw or jaws and the levers may be reset by means of springs.

BRIEF DESCRIPTION OF THE DRAWINGS

FIG. 2 is a transverse sectional view showing the welding apparatus.

DETAILED DESCRIPTION OF THE PREFERRED EMBODIMENT

Figure 1:
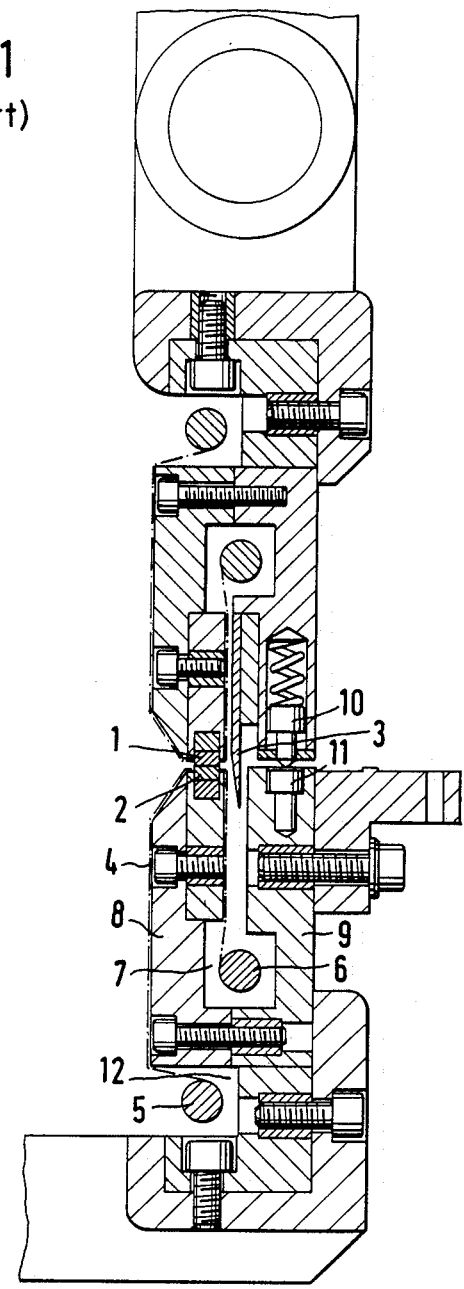
FIG. 1 shows a welding apparatus of the prior art.
Figure 2A:
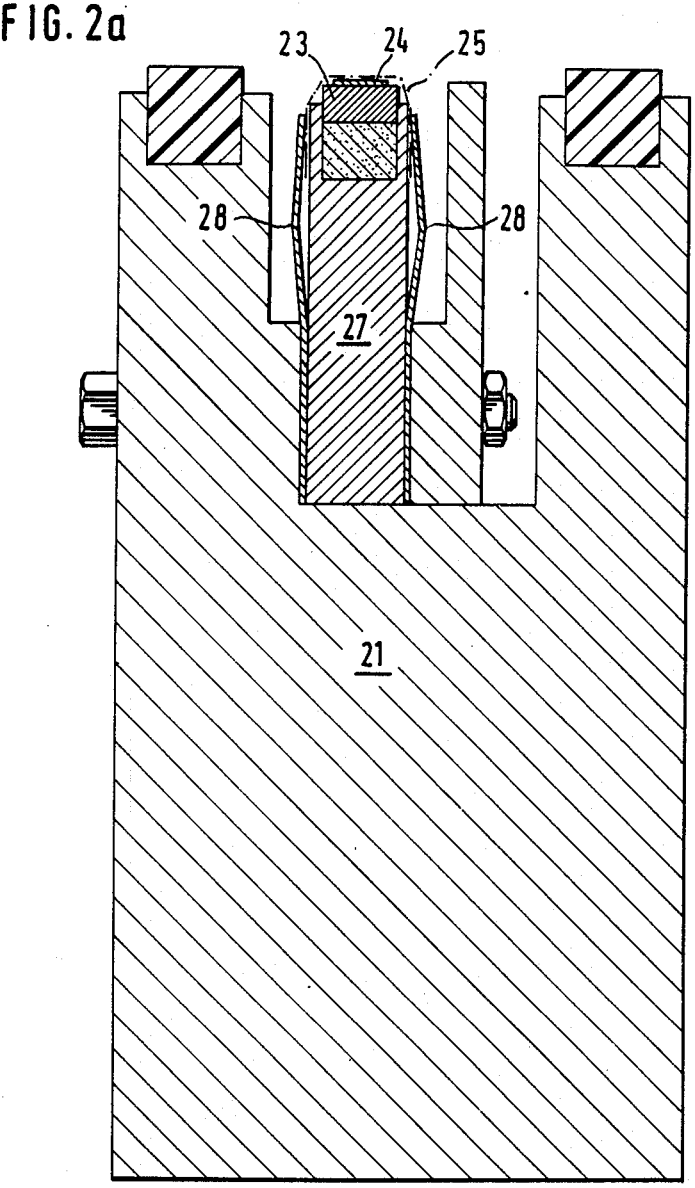
FIG. 2a is an enlarged transverse sectional view of the lower welding jaw.
Figure 3:
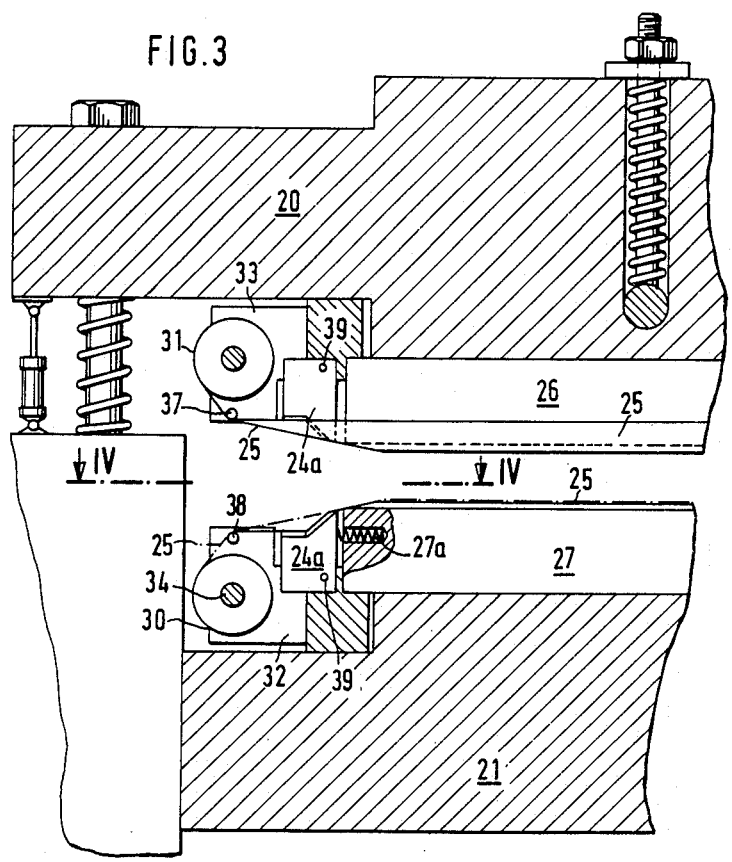
FIG. 3 is a side elevation showing one side of the welding apparatus without a retaining plate and without a severing knife.

An illustrative embodiment of the invention will now be explained more in detail with reference to the drawing.

Parallel welding bars 22, 23 are mounted in the welding jaws 20, 21, each welding bar having a top welding surface and lateral side surfaces. The lower welding jaw is mounted in the machine frame at a fixed location. The upper welding jaw is connected to drive means, which are not shown and serve to move the upper welding jaw up and down. Heatable welding strips 24 extend over the confronting faces of the welding bars 22, 23. The welding bars 22, 23 are covered by tensioned polytetrafluoroethylene strips 25, which are channel-shaped and have lateral portions in contact with the welding bars 22, 23 and/or the associated holders 26, 27. Spring steel strips 28 are screw-connected to the holders 26, 27 and have free portions, which extend adjacent to the welding bars and cover the polytetrafluoroethylene strips and urge the latter against the lateral side surfaces of the welding bars and/or the associated holders 26, 27.

Figure 4:
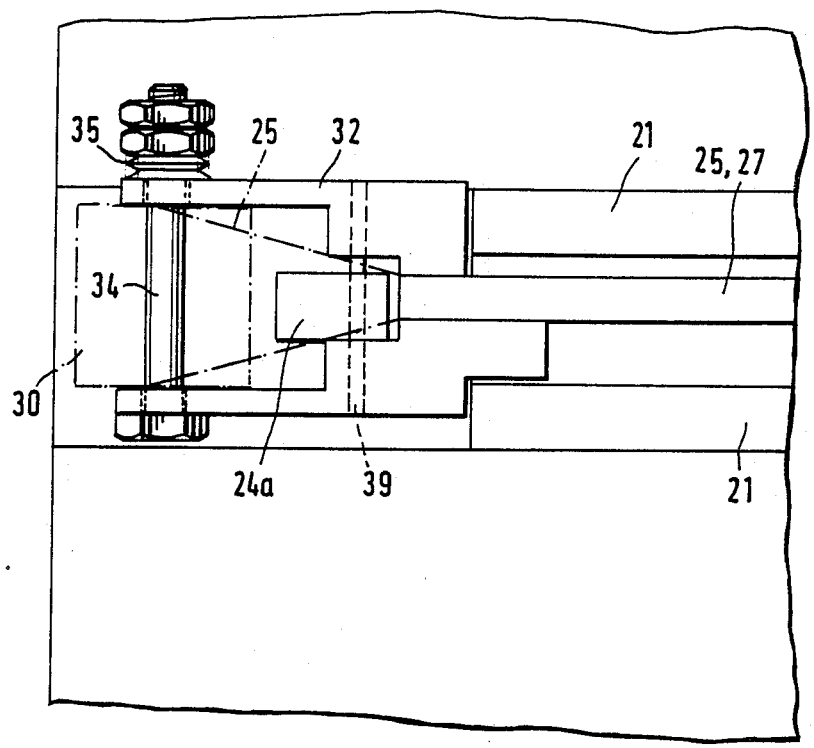
FIG. 4 is a top plan view taken on line IV—IV of FIG. 3 and showing the lower welding jaw.

The polytetrafluoroethylene strips 25 have been wound on rolls 30, 31, which are rotatably mounted on axles 34 which extend beyond opposite ends of the welding bars and are mounted on forked brackets 32, 33 to extend transversely thereto. The brackets 32, 33 are mounted on the welding jaws. Means for movably mounting the axles 34 and the design of the brackets 32 are apparent from FIG. 4. Forked brackets 32, 33 are connected by screws, not shown, to the lower welding jaw 21. As the axle 34 is biased by disk springs 35, the polytetrafluoroethylene strip 25 can be withdrawn under an adjustable initial tension. The welding strips 24 are gripped at their ends in clamping members 24a, which are pivoted on pivots 39 and are urged by springs 27a to perform a pivotal movement tending to tension the welding strips.

The polytetrafluoroethylene strip 25 is trained around deflecting rods 37, 38 as it is withdrawn from or runs up on a roll so that a satisfactory movement of the polytetrafluoroethylene strip to and from the rolls and to the welding bars will be ensured.

Figure 5:
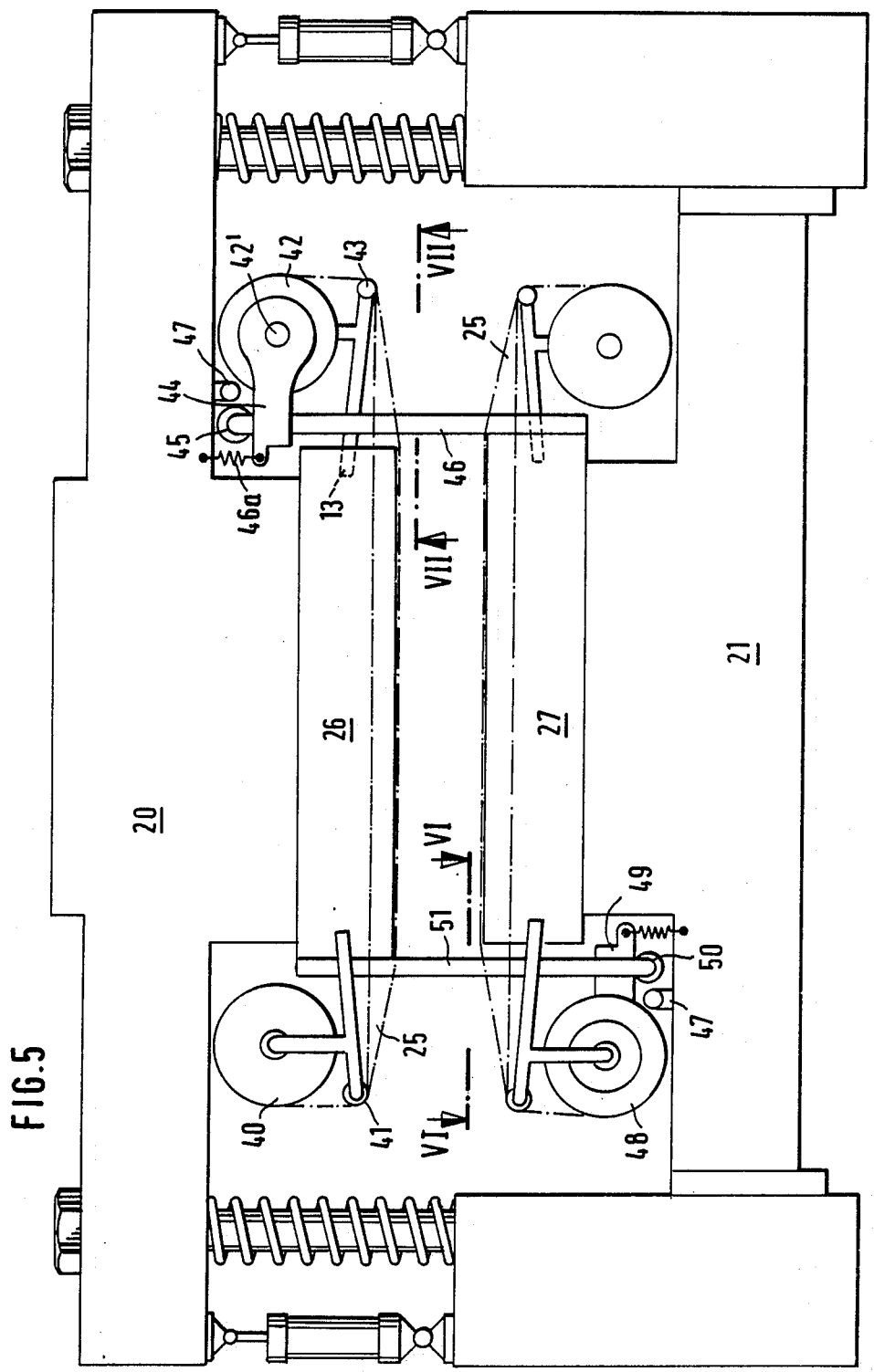
FIG. 5 is a diagrammatic side elevation showing the welding jaws.
Figure 6:
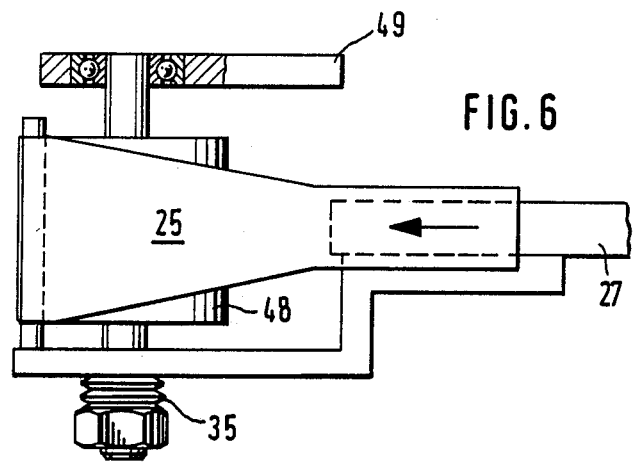
FIG. 6 is a top plan view taken on line VI—VI in FIG. 5 and showing the left-hand lower roll.
Figure 7:
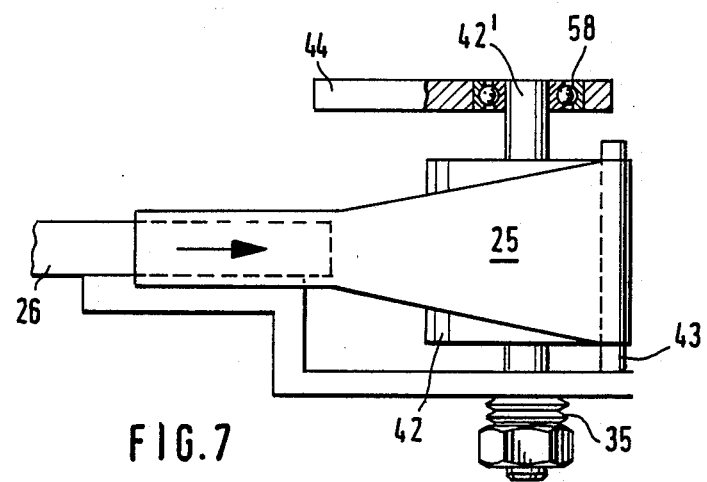
FIG. 7 is a top plan view taken on line VII—VII in FIG. 5 and showing the right-hand upper roll.

It is diagrammatically illustrated in FIGS. 5 and 6 how the winding roll is driven in dependence on the motion of the welding jaws so that the polytetrafluoroethylene strip will intermittently be moved along the welding bars in dependence on the consumption of the strip.

The unused polytetrafluoroethylene strip is stored on the roll 40, which is carried by an axle or shaft. That axle or shaft is mounted on and extends between brackets, which are connected to the associated welding jaws. The polytetrafluoroethylene strip which has been withdrawn from the roll 40 is trained around the reversing rod 41, which is fixed to the welding jaw, and thereafter the strip assumes a U shape in cross-section as it moves over and along the welding bar. The strip 25 is subsequently wound on the winding roll 42, to which the strip is delivered via the reversing rod 43, which is fixed to the welding jaw. The axle 42' of the winding roll 42 is secured to the mounting bracket 26 by means of holders 13 and a free-wheel 58.

The rotatable part of the free-wheel 58 is connected to the roll and is provided with a feed lever 44, which strikes against a roller 45 at the end of each movement of the welding jaw. The roller 45 is mounted on a bracket 46, which is connected to other welding jaws. After each welding cycle the roller 45 is struck so that the lever 44 is rotated through a small angle. That rotation imparts a rotation to the roll 42 so that the polytetrafluoroethylene strip 25 is withdrawn from the roll 40. The lever 44 is reset by the prestressed spring 46a, which is held between the end of the lever 44 and a part that is fixed to the jaw. The spring 46a urges the lever 44 against an abutment 47, which is fixed to the welding jaw.

Similarly, the roll 48 is also provided with a free-wheel and a spring-loaded lever 49. The latter is rotated through small angular increments by the actuating roller 50, which is mounted on the bracket 51, which is connected as illustrated to the movable welding jaw.

I claim:

1. A welding apparatus for welding flat webs or web sections made of synthetic thermoplastics, said welding apparatus comprising
   two parallel welding bars adapted to be raised and lowered relative to each other, each having a top welding surface and lateral side surfaces,
   tensioned strips of polytetrafluoroethylene covering said welding bars and fixed on rolls disposed beyond opposite ends of each welding bar, said rolls serving to wind up and unwind said tensioned strips,
   said tensioned polytetrafluoroethylene strips covering the top welding surfaces and at least part of one of said lateral side surfaces and extending in a longitudinal direction of said bars, said rolls being movably mounted beyond opposite ends of said welding bars on axles extending transversely to said longitudinal direction of said welding bars, and guiding elements provided at least on one side of said lateral side surfaces of each welding bar and each of said elements together with one lateral side surface of the associated welding bar defining a passage for guiding an edge portion of said strips.

2. A welding apparatus according to claim 1, wherein the guiding elements include spring plates screw-connected to the welding bars.

3. A welding apparatus according to claim 1, wherein deflecting means for guiding the polytetrafluoroethylene strips are provided between the ends of the welding bars and the rolls.

4. A welding apparatus according to claim 1, wherein the rolls are engaged by spring-loaded braking elements.

5. A welding apparatus for welding flat webs or web sections made of synthetic thermoplastics, said welding apparatus comprising two parallel welding bars adapted to be raised and lowered relative to each other, tensioned strips of polytetrafluoroethylene covering said welding bars and fixed on rolls disposed beyond opposite ends of each welding bar, said rolls serving to wind up and unwind said tensioned strips, said tensioned strips covering the welding bars extend in a longitudinal direction of said bars, the rolls being movably mounted beyond opposite ends of the welding bars on axles extending transversely to said longitudinal direction of said welding bars, and one of the rolls withdraws the polytetrafluoroethylene strip and is mounted on its associated axle by a free-wheel and is provided with a lever, said lever being intermittently moved in small angular increments and is adapted to be reset, and means for intermittently moving the lever in small angular increments by moving the welding jaws, and spring means for resetting the levers.

* * * * *